(12) United States Patent
Iwata (10) Patent No.: US 8,656,965 B2
(45) Date of Patent: Feb. 25, 2014

(54) BLEEDER PLUG

(75) Inventor: Yukio Iwata, Tokyo (JP)

(73) Assignee: Akebono Brake Industry Co., Ltd., Tokyo (JP)

( * ) Notice: Subject to any disclaimer, the term of this patent is extended or adjusted under 35 U.S.C. 154(b) by 0 days.

(21) Appl. No.: 13/635,003

(22) PCT Filed: Mar. 15, 2011

(86) PCT No.: PCT/JP2011/056117
§ 371 (c)(1),
(2), (4) Date: Sep. 14, 2012

(87) PCT Pub. No.: WO2011/115141
PCT Pub. Date: Sep. 22, 2011

(65) Prior Publication Data
US 2013/0008547 A1   Jan. 10, 2013

(30) Foreign Application Priority Data

Mar. 17, 2010 (JP) .................................. 2010-060823

(51) Int. Cl.
*F16K 51/00* (2006.01)
(52) U.S. Cl.
USPC ............. 141/98; 188/352; 251/215; 251/344; 251/346; 251/351
(58) Field of Classification Search
USPC ............ 251/215–216, 344, 346, 351; 141/98; 188/352
See application file for complete search history.

(56) References Cited

U.S. PATENT DOCUMENTS

| | | | | |
|---|---|---|---|---|
| 2,892,614 A | * | 6/1959 | Majneri | 251/347 |
| 3,677,513 A | * | 7/1972 | Truelove | 251/148 |
| 3,727,638 A | * | 4/1973 | Zaremba et al. | 137/572 |
| 4,445,530 A | * | 5/1984 | Meixell | 137/381 |
| 4,470,577 A | * | 9/1984 | Warwick | 251/217 |
| 4,807,847 A | * | 2/1989 | Martz | 251/144 |
| 4,989,639 A | * | 2/1991 | Sulwer | 137/614.17 |
| 5,447,214 A | * | 9/1995 | Appelgren | 188/352 |
| 5,560,457 A | * | 10/1996 | Rike | 188/352 |
| 5,579,815 A | * | 12/1996 | Labonte | 141/384 |
| 6,581,905 B2 | * | 6/2003 | Rafko et al. | 251/148 |
| 7,134,641 B2 | * | 11/2006 | Jensen et al. | 251/149.8 |
| 7,347,407 B2 | * | 3/2008 | Chen | 251/208 |

FOREIGN PATENT DOCUMENTS

| | | |
|---|---|---|
| FR | 1.250.139 | 1/1961 |
| JP | 61-97637 | 6/1986 |
| JP | 63-188268 | 12/1988 |
| JP | 64-6437 | 1/1989 |

* cited by examiner

*Primary Examiner* — John Bastianelli
(74) *Attorney, Agent, or Firm* — Drinker Biddle & Reath LLP (57) ABSTRACT

A bleeder plug is provided with a bleeder body having a nipple portion and a threaded portion and being provided with a through hole extending from the nipple portion-side end to the threaded portion-side end; a seat pin having a press fitting portion to be press-fitted in an opening of the through hole at the threaded portion-side in the bleeder body and a seat portion blocking a bleeder hole, and a groove formed in a contact surface between the bleeder body and the seat pin and communicating the opening of the through hole at the nipple portion-side with an outside space via the contact surface.

11 Claims, 10 Drawing Sheets

BLEEDER PLUG

TECHNICAL FIELD

The invention relates to a bleeder plug, and more particularly, to a bleeder plug that is used for air bleeding in a hydraulic brake.

BACKGROUND ART

A variety of bleeder plugs that are used in a hydraulic brake apparatus of an automobile, a motorcycle and the like have been suggested. A basic type is disclosed in PTL 1, for example.

Figure 9:
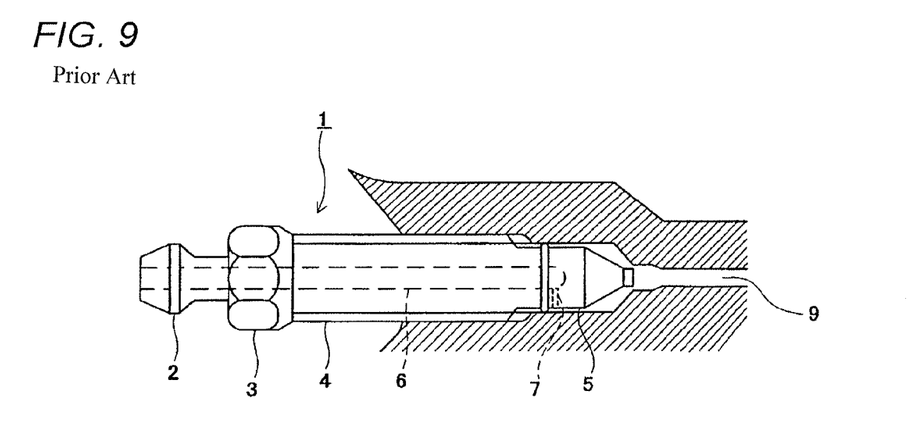
FIG. 9 shows a basic configuration of a bleeder plug according to the prior art.

As shown in FIG. 9, a bleeder plug disclosed in PTL 1 has a nipple portion 2, a threaded portion 4 and a seat portion 5.

The nipple portion 2 is a portion having a discharge port to which a resin tube and the like for delivering operating oil to be discharged upon air bleeding to another receptacle and the like is connected. The nipple portion 2 is formed at its end with an air bleeding hole 6 extending to the seat portion 5, which will be described later.

The threaded portion 4 is formed with a male thread that can be threaded to a female thread of a bleeder hole 9 formed in a brake caliper and the like. An engaging portion 3 having a hexagonal shape is provided between the nipple portion 2 and the threaded portion 4. The bleeder plug 1 can be engaged through the threaded portion 4.

The seat portion 5 is a portion that is formed at a leading end of the threaded portion 4 and blocks an opening of the bleeder hole 8 that is an object to be attached. The seat portion 5 has a seat surface consisting of an inclined surface having a truncated conical shape at a leading end, and brings the seat surface into contact with the opening of the bleeder hole 9, thereby preventing the operating oil from leaking when engaging the bleeder plug 1. Also, the seat portion 5 is provided with a horizontal hole 7 communicating with the air bleeding hole 6 at a body portion thereof positioned between the seat surface and the threaded portion 4.

By the above configuration, when the bleeder plug 1 is disengaged and the blocking of the air bleeding hole 6 by the seat surface is released, the air and air operating oil are discharged from the air bleeding hole 6 through the horizontal hole 7.

Also, Patent Documents 2 to 4 disclose bleeder plugs having a two-piece structure.

Figure 10A:
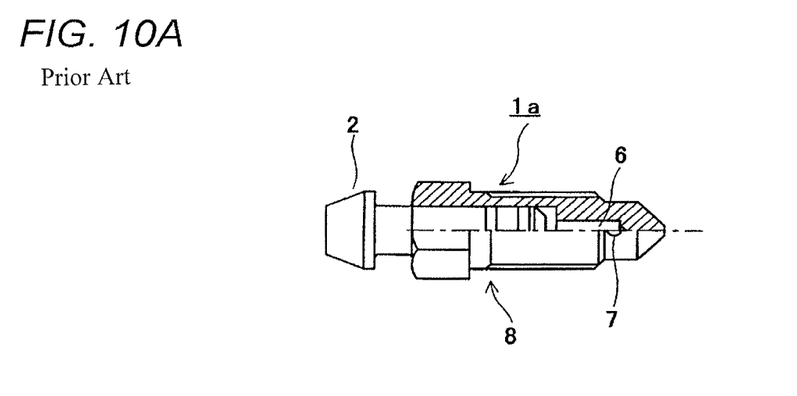
FIG. 10A is a partially sectional front view of the bleeder plug.
Figure 10B:
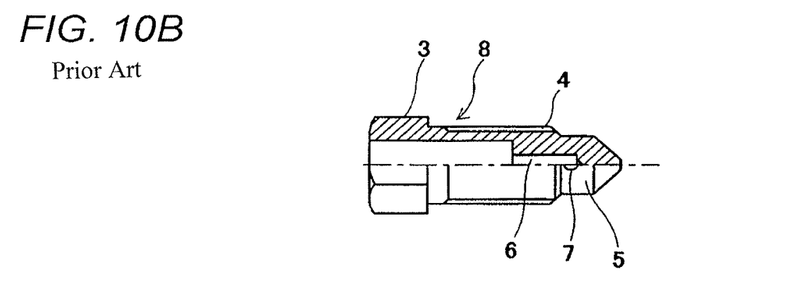
FIG. 10B is a partially sectional front view of a bleeder body and FIG. 10C is a partially sectional front view of a nipple portion.
Figure 10C:
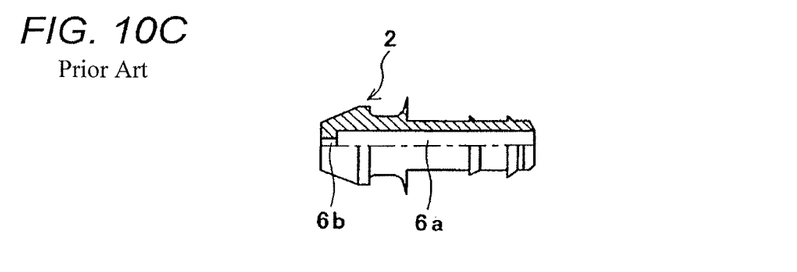

A bleeder plug disclosed in PTL 2 has a bleeder body 8 made of metal and a nipple portion 2 made of resin, as shown in FIGS. 10A to 10C. The nipple portion 2 is press-fitted to a rear end of the bleeder body 8. Meanwhile, FIG. 10A is a partially sectional front view of the bleeder plug, FIG. 10B is a partially sectional front view of the bleeder body and FIG. 10C is a partially sectional front view of the nipple portion.

The bleeder body 8 is formed with an air bleeding hole 6 and a horizontal hole 7, like the bleeder plug 1 disclosed in PTL 1, and the nipple portion 2 is provided at one end of a through hole 6a with a valve 6b that is opened by pressure. An end of the nipple portion 2, to which the valve 6b is not provided, is press-fitted in the bleeder body 8, so that the valve 6b is arranged at an end of the bleeder plug 1a.

Thereby, it is possible to prevent clay and dust from being introduced into a hole (air bleeding hole 6 including the through hole 6a) of the bleeder plug 1a without mounting a bleeder cap (not shown) made of resin.

Figure 11:
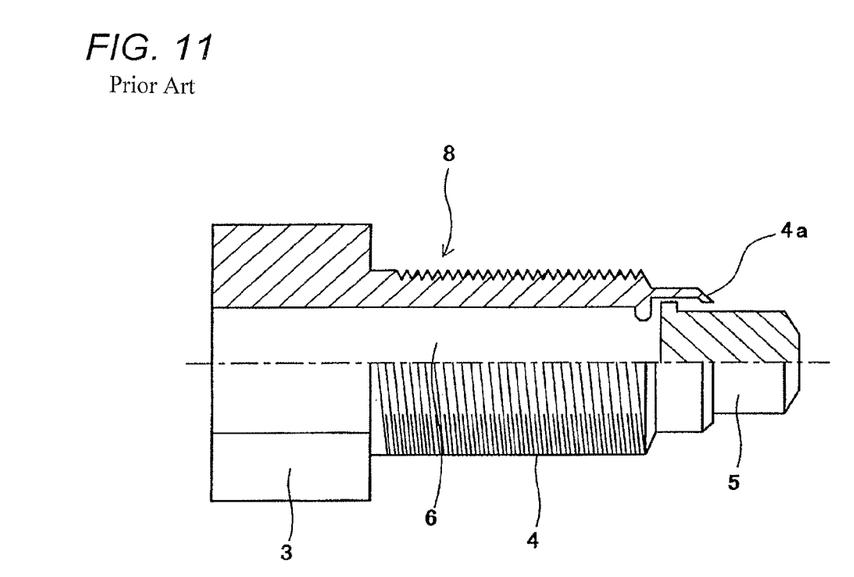
FIG. 11 shows a configuration of a bleeder body of a bleeder plug having a three-piece structure, which is a bleeder plug of the prior art.

In a bleeder plug disclosed in PTL 3, a bleeder body and a nipple portion are separately formed and a portion formed by forge processing is extended, thereby reducing the processing time and cost consumed for cutting processing. Also, as shown in FIG. 11, PTL 3 also discloses a configuration where a seat portion is further configured separately and is caulked and fixed by a caulking portion 4a provided to a leading end of the bleeder body.

PTL 4 discloses a bleeder plug having a seat portion of a press fitting structure that is provided to a bleeder body. An air bleeding hole provided to the bleeder body has a structure where a seat portion-side opening has a small diameter and a widened portion therein. A rear of the seat portion is provided with an insertion portion that is inserted into the air bleeding hole. A leading end of the insertion portion is formed with a longitudinal slit having a diameter larger than the small diameter portion. The insertion portion can be press-fitted into the plug main body by elastic deformation.

CITATION LIST

Patent Literature

[PTL 1] JP-U-61-97637 (line 18 of page 5 to line one of page 8 and FIG. 1)
[PTL 2] JP-U-63-188268 (lines 10 to 20 of page 7 and FIG. 1)
[PTL 3] JP-U-64-6437 (line 2 of page 4 to line 6 of page 4, line 20 of page 6 to line 10 of page 7 and FIGS. 2 and 5)
[PTL 4] FR-A-1250139 (line 32 on right column of page 1 to line 3 on left column of page 2 and FIG. 1)

SUMMARY OF INVENTION

Technical Problem

In the above bleeder plugs, the bleeder plugs disclosed in Patent Documents 1 to 3 have problems that the cutting process is required for many portions with respect to the formation of the shape and the improvements on the processing cost and productivity are needed.

Also, the pleader plug disclosed in FIG. 5 of PTL 3 has a problem of the durability because a thickness of the caulking portion holding the seat portion may become very thin.

According to the bleeder plug disclosed in PTL 4, the cutting processing is required to form the press fitting portion at a seat pin configuring the seat portion, and when the seat pin and an end of the bleeder body are adhered, the air bleeding cannot be made.

The invention has been made to solve the above problems. An object of the invention is to provide a bleeder plug that can be manufactured without cutting processing in a manufacturing process and in which a problem in bleeding air, caused due to adhesion, does not occur.

Solution to Problem

In order to achieve the above object, there is provided a bleeder plug comprising:
a bleeder body including a nipple portion and a threaded portion, and formed with a through hole extending from the nipple portion-side end to the threaded portion-side end;
a seat pin including a press fitting portion to be press-fitted in an opening of the through hole of the bleeder body at the threaded portion-side and a seat portion blocking a bleeder hole, and
a groove, formed in a contact surface between the bleeder body and the seat pin, and communicating the opening of the through hole at the nipple portion-side with an outside space via the contact surface.

In the bleeder plug having the above configuration, at least a part of the through hole has a constricted portion in which a diameter thereof is decreased, the press fitting portion has a loose fitting portion having a diameter smaller than the constricted portion and a protruding portion provided on an outer periphery of the loose fitting portion and making a radius of the press fitting portion smaller than a radius of the through hole and larger than the constricted portion, and a length from the seat portion to the protruding portion of the press fitting portion is longer than a length from the opening at the threaded portion-side to the constricted portion.

By the above configuration, the seat portion of the seat pin has a so-called swing (oscillating) function. Thus, even when central axes of the threaded portion and the seat portion are deviated, it is possible to automatically align the same with respect to the bleeder hole.

In the bleeder plug having the above configuration, the protruding portion may include a plurality of protrusions arranged on the outer periphery of the loose fitting portion.

By this configuration, it is possible to easily perform the press fitting and to realize the retaining effect at the same time.

In the bleeder plug having the above configuration, the through hole may have a small diameter portion at the nipple portion-side and a large diameter portion at the threaded portion-side.

By this configuration, it is possible to thicken a diameter of the press fitting portion and to prevent the press fitting portion from being buckled upon the press fitting.

Also, in the bleeder plug having the above configuration, the groove may be provided to the bleeder body.

By this configuration, it is not necessary to provide a groove to the seat pin-side.

Also, in the bleeder plug having the above configuration, the groove may be provided to the seat pin.

By this configuration, it is not necessary to provide a groove to the bleeder body.

Also, in the bleeder plug having the above configuration, the contact surface may include a first contact surface configured by the threaded portion-side end of the bleeder body and the seat portion, and a second contact surface configured by the through hole and the press fitting portion, and the groove may be provided to at least one of the threaded portion-side end of the bleeder body and the seat portion configuring the first contact surface and at least one of the through hole and the press fitting portion.

By this configuration, it is possible to variously vary the arrangement of the grooves.

Further, in the bleeder plug having the above configuration, a base portion of the press fitting portion may be provided with a peripheral groove making a round of an outer periphery thereof.

By this configuration, even when the formation positions of the groove (first groove) provided to the first contact surface and the groove (second groove) provided to the second contact surface are deviated, it is possible to secure the paths of the operating oil and air.

BRIEF DESCRIPTION OF DRAWINGS

FIGS. 1A and 1B show a configuration of a bleeder plug according to a first illustrative embodiment, in which FIG. 1O is a right side view of FIG. 1A.

FIGS. 2A to 2C show a configuration of a bleeder body of the bleeder plug according to the first illustrative embodiment, in which

FIGS. 3A to 3C show a configuration of a seat pin of the bleeder plug according to the first illustrative embodiment, in which

FIGS. 7A and 7B show a configuration of a seat pin of the bleeder plug according to the second illustrative embodiment, in which

FIGS. 8A to 8C show an application example of a bleeder plug according to the second illustrative embodiment, in which

FIGS. 10A to 10C show a configuration of a bleeder plug according to the prior art, in which

DESCRIPTION OF EMBODIMENTS

Hereinafter, illustrative embodiments of the bleeder plug of the invention will be specifically described with reference to the drawings. First, a first illustrative embodiment of the bleeder plug of the invention will be described with reference to FIGS. 1A to 4.

Figure 1A:
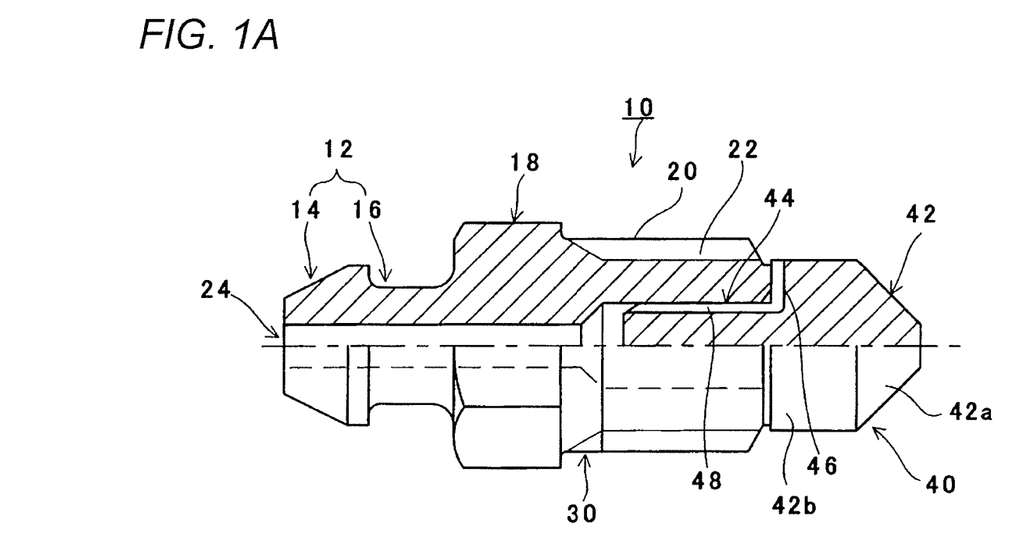
FIG. 1A is a partially sectional front view.
Figure 1B:
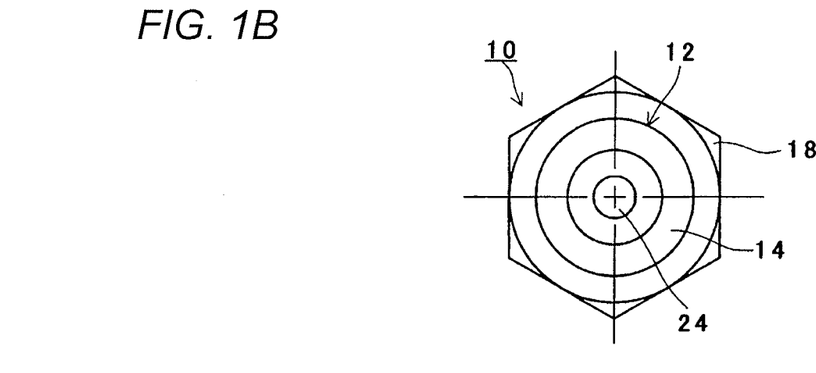
FIG. 1B is a left side view of FIG. 1A
Figure 1C:
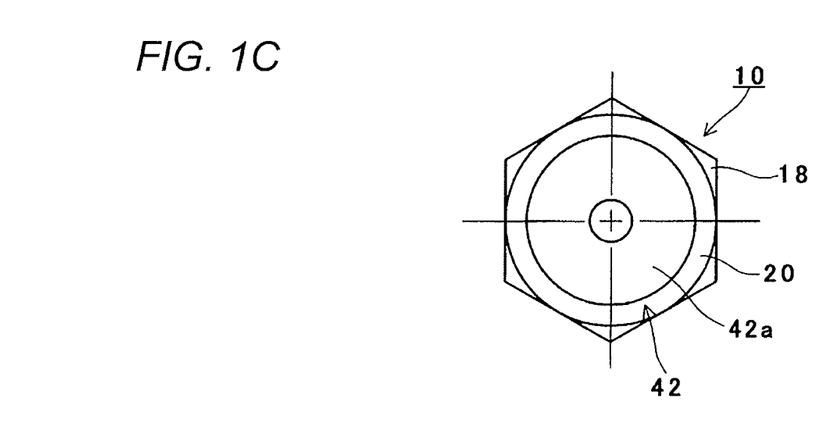

As shown in FIGS. 1A to 1C, a bleeder plug 10 of the first illustrative embodiment has a bleeder body 30 and a seat pin 40.

The bleeder body 30 has an outward appearance consisting of a nipple portion 12, an engaging portion 18 and a threaded portion 20 and is formed with a through hole 24.

The nipple portion 12 is a constitutional element that is positioned at one end of the bleeder body 30 and is formed at its end with a one-side opening of the through hole 24, which will be described later. An outward appearance of the nipple portion 12 is configured by a head portion 14 and a constricted portion 16. The head portion 14 has a truncated conical shape and the constricted portion 16 has a cylindrical shape. The head portion and the constricted portion have a configuration so that a tube and the like can be mounted thereto so as to enable operating oil, which is discharged through the bleeder plug 10, to flow into a separate receptacle when bleeding air or replacing operating oil. By a balance of the head portion 14 and the constricted portion 16, the head portion 14 serves as a so-called barb and the exhibits a retaining function. Also, a rear end (a connection side with the constricted portion 16) of the head portion 14 is formed at a bottom surface of the truncated cone with a cylindrical portion 14a, so that a frictional force (retaining force) against the connected tube is secured and the tube made of resin is prevented from being scratched (refer to FIG. 2A).

The engaging portion 18 is a constitutional element that is positioned between the nipple portion 12 and a threaded portion 20 (which will be specifically described later) and has an outward appearance that is engaged to an engaging tool, which is used to screw the bleeder plug 10 into a bleeder hole 60 that is an object to be attached of the bleeder plug 10. In this illustrative embodiment, the engaging portion 18 has a hexagonal sectional shape. By this outward appearance, it is possible to use a spanner, which is typically used to engage a bolt and the like when engaging the bleeder plug 10, so that the versatility is increased.

The threaded portion 20 is a constitutional element having a male thread 22 formed thereon, which is screwed into the bleeder hole 60. The threaded portion 20 is provided, so that it is possible to securely mount the bleeder plug 10 into the bleeder hole 60 (refer to FIG. 4). Also, the threaded portion 20 is formed by rolling processing, so that it is possible to form the male thread 22 without a cutting operation. Therefore, a fiber flow of the formation material is not cut, so that it is possible to improve the wear resistance and the stress resistance characteristic in a thrust direction.

Figure 2A:
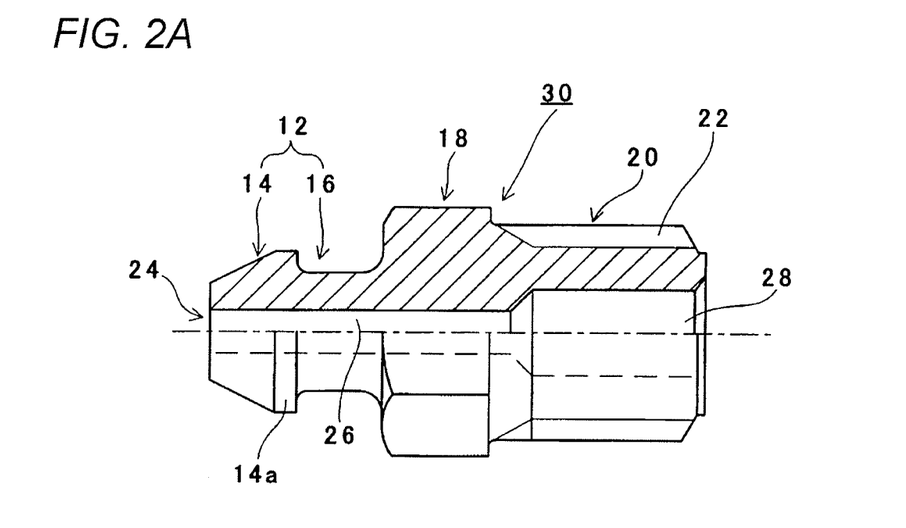
FIG. 2A is a partially sectional front view.
Figure 2B:
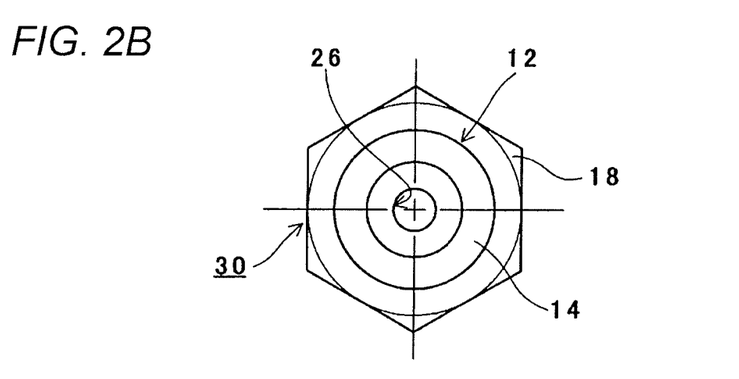
FIG. 2B is a left side view of FIG. 2A
Figure 2C:
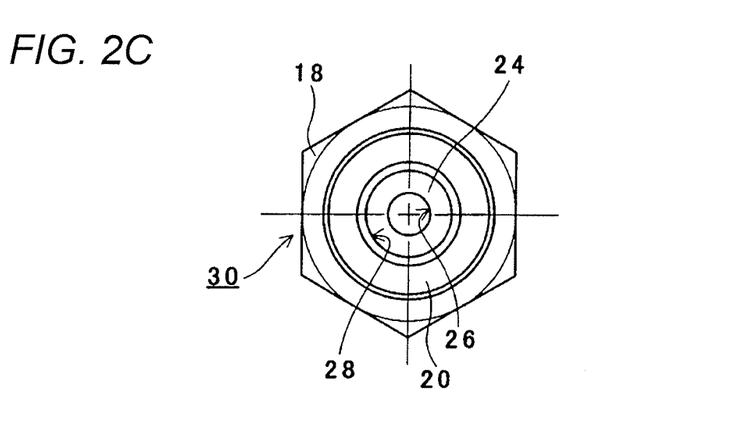
FIG. 2C is a right side view of FIG. 2A.

As shown in FIGS. 2A to 2C, the through hole 24 is a hole that is formed to penetrate the bleeder body 30 in a longitudinal direction, i.e., to penetrate the nipple portion 12, the engaging portion 18 and the threaded portion 20, and has a small diameter portion 26 and a large diameter portion 28. The small diameter portion 26 of the small diameter portion 26 and the large diameter portion 28 configuring the through hole 24 is arranged at the nipple portion 12-side and the large diameter portion 28 is arranged at the threaded portion 20-side. As described above, the nipple portion 12 has a constricted portion having the small diameter portion as an outward appearance. Hence, the small diameter portion 26 of the through hole 24 is arranged at the nipple portion 12-side, so that it is possible to secure a thickness of the material at the constricted portion 16 and also to secure the strength of the constricted portion 16. Also, the large diameter portion 28 is arranged at the threaded portion 20-side, so that it is possible to thicken a diameter of a press fitting portion 44 (FIG. 1) of the seat pin 40 that is press-fitted into the through hole 24. Thereby, it is possible to prevent the trouble such as buckling of the press fitting portion 44 upon the press-fitting. Also, a length of the large diameter portion 28 is configured to be longer than that of the press fitting portion 44 of the seat pin 40, which will be specifically described later.

Figure 3A:
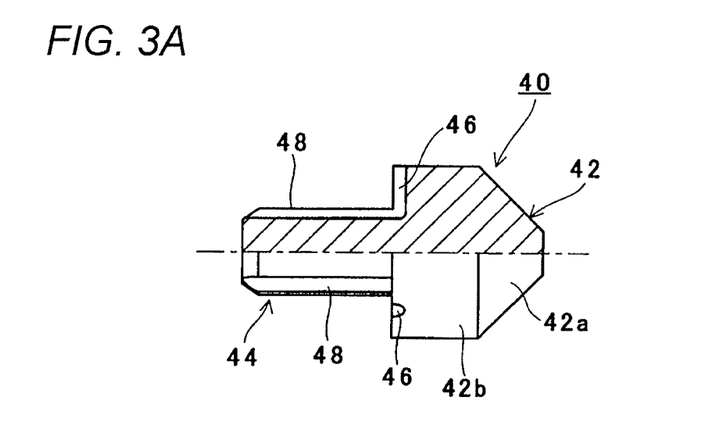
FIG. 3A is a partially sectional front view.
Figure 3B:
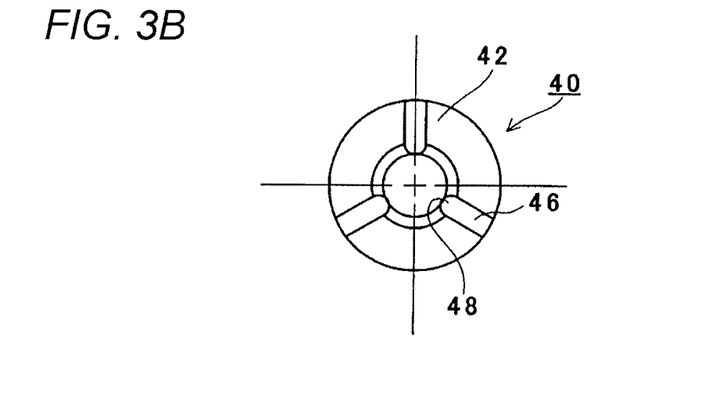
FIG. 3B is a left side view of FIG. 3A
Figure 3C:
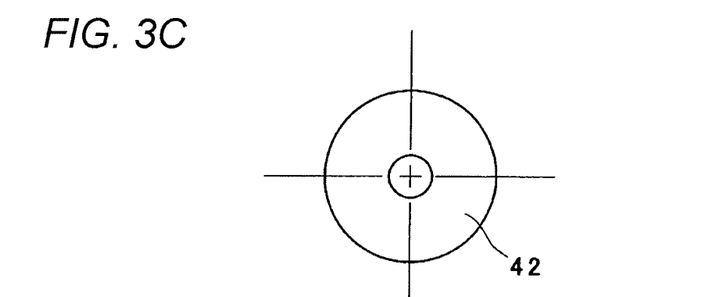
FIG. 3C is a right side view of FIG. 3A.

As shown in FIGS. 3A to 3C, the seat pin 40 has a seat portion 42 and the press fitting portion 44. The seat portion 42 is configured by a leading end 42a of a truncated conical shape and a cylindrical main body 42b. An outer peripheral surface of the leading end 42a, which has a truncated conical shape, configures a seat surface and abuts on the opening of the bleeder hole 60 (FIG. 4), thereby preventing the operating oil from leaking. The seat surface is configured by the inclined surface, so that the contact surface with the bleeder hole 60 forms the minimum area of a circular shape that is a shape of the opening of the bleeder hole 60. Hence, the seat surface is little influenced by the unevenness due to the dust and the like, so that it is possible to easily secure the sealability.

The press fitting portion 44 is a cylinder provided to a rear end side of the seat portion 42 and is concentrically arranged with the seat portion 42. The press fitting portion 44 has a diameter smaller than the main body 42b configuring the seat portion 42 and slightly larger than the large diameter portion 28 (FIG. 2) of the through hole 24, so that it can be press-fitted into the large diameter portion 28 configuring the through hole 24.

In the seat pin 40 having the above basic configuration, a surface that configures the seat portion 42 and faces the threaded portion is formed with a first groove 46 extending from an outer periphery of the main body 42b to the press fitting portion 44. Also, an outer periphery of the press fitting portion 44 is formed with a second groove 48 extending from an end of the first groove 46 over a longitudinal direction of the press fitting portion 44. By providing the first groove 46 and the second groove 48, even when the seat pin 40 and the bleeder body 30 are closely contacted each other, it is possible to guide the air or operating oil, which is discharged from the bleeder hole 60, to the through hole 24 of the bleeder body 40.

The bleeder plug 10 having the above configuration can be manufactured without cutting processing. Therefore, it is possible to suppress the processing cost and to improve the productivity.

In the manufacturing process, the bleeder body 30 and the seat pin 40 are separately manufactured and the seat pin 40 is press-fitted into the bleeder body 30, so that the process is completed. The bleeder body 30 and the seat pin 40 can be also formed by cold forging. The bleeder body 30 can be manufactured by forming an outward appearance with a die forging, forming the through hole 24 with an extrusion and then forming the mail thread 22 on the threaded portion 20 with a thread-rolling. Also, the seat pin 40 can be manufactured by the die forging.

The bleeder plug 10 having the above configuration can be made of aluminum (Al), in addition to the conventional SS400 or carbon steel for forging. Currently, a caliper (not shown) of a brake apparatus having the bleeder hole 60 can be made of light aluminum. In this case, when the bleeder plug 10 is made of iron such as SS400, an electric corrosion occurs between the bleeder plug and the bleeder hole 60. Compared to this, when the bleeder plug 10 is made of aluminum, it is possible to avoid the problem of the electric corrosion between the bleeder plug and the bleeder hole 60.

Figure 4:
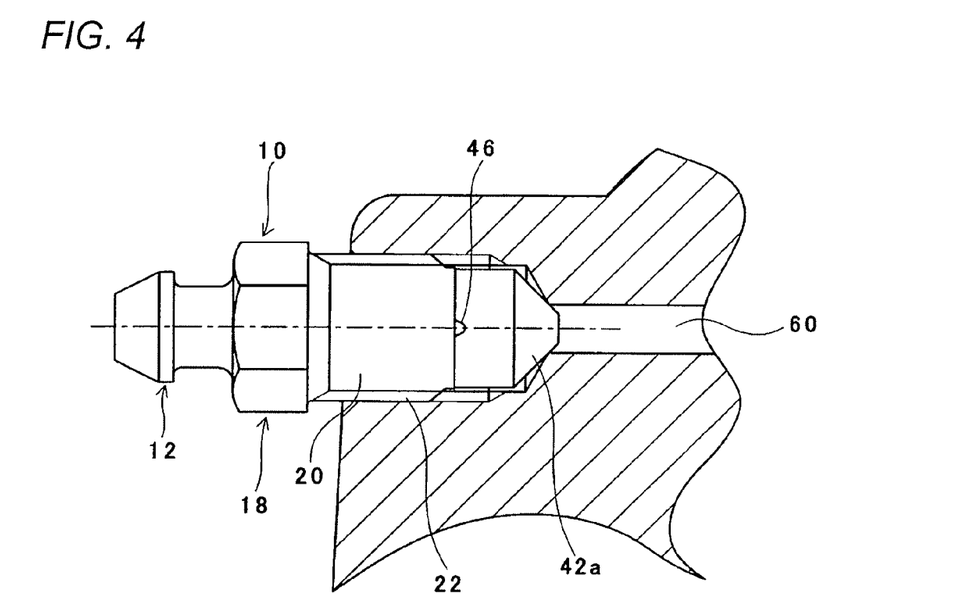
FIG. 4 shows a state where the bleeder plug shown in FIG. 1 is attached.

As shown in FIG. 4, according to the bleeder plug 10 having the above configuration of the first illustrative embodiment, the seat surface of the seat portion 42 and the opening of the bleeder hole 60 abut each other by the engagement, so that the it is possible to block the bleeder hole 60 and to thus prevent the leakage of the operating oil. Also, when the bleeder plug is disengaged and a gap is thus formed between the opening of the bleeder hole 60 and the seat surface, the operating oil flowing from the bleeder hole 60 and the air included in the operating oil pass through the first groove 46, the second groove 48 and the through hole 24 and are then discharged to the outside.

In the bleeder hole 10 of this illustrative embodiment, the first grove 46 and the second groove 48 are provided to the seat pin 40. However, the first groove and the second groove may be provided to the bleeder body 30. In this case, the first groove is provided on a surface facing the seat portion 42, which surface is an end surface of the threaded portion of the bleeder body 30, and the second groove is provided on an inner periphery of the large diameter portion 28 of the through hole 24. Also in this configuration, it is possible to manufacture the bleeder plug without the cutting processing, and to secure the path of the operating oil and air even when the bleeder body 30 and the seat pin 40 are closely contacted each other.

Also, the first groove may be provided to the seat portion 42 and the second groove may be provided on the inner periphery of the large diameter portion 28. Alternatively, the first groove may be provided to the threaded portion 20 and the second groove may be provided to the press fitting portion 44. In this configuration, an annular groove (inner periphery groove: not shown) may be provided to a bonding portion between the press fitting portion 44 and the seat portion 42 or the opening of the large diameter portion 28 may be slightly largely chamfered. By this configuration, it is possible to secure the path of the operating oil and air even when the formation positions of the first groove and the second groove are deviated.

In the below, a second illustrative embodiment of the bleeder plug of the invention is described with reference to FIGS. 5 to 7B. A basic configuration of a bleeder plug 110 of the second illustrative embodiment is the same as the bleeder plug 10 of the first illustrative embodiment. Therefore, the corresponding portions having the same functions are indicated with reference numerals obtained by adding 100 to the corresponding reference numerals.

Figure 5:
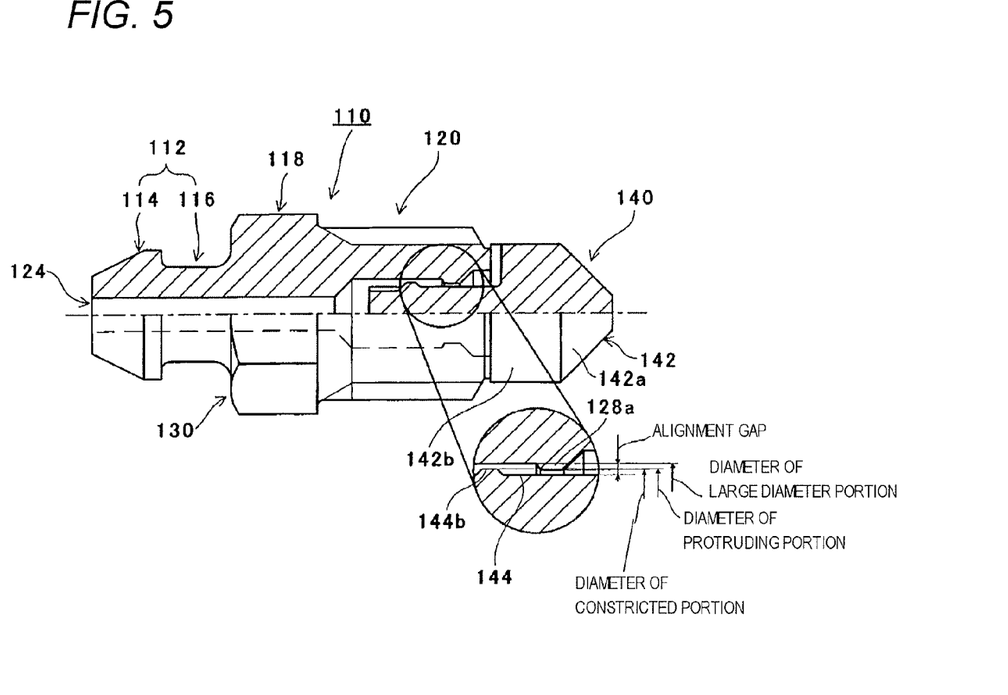
FIG. 5 is a partially sectional front view showing a configuration of a bleeder plug according to a second illustrative embodiment.
Figure 6:
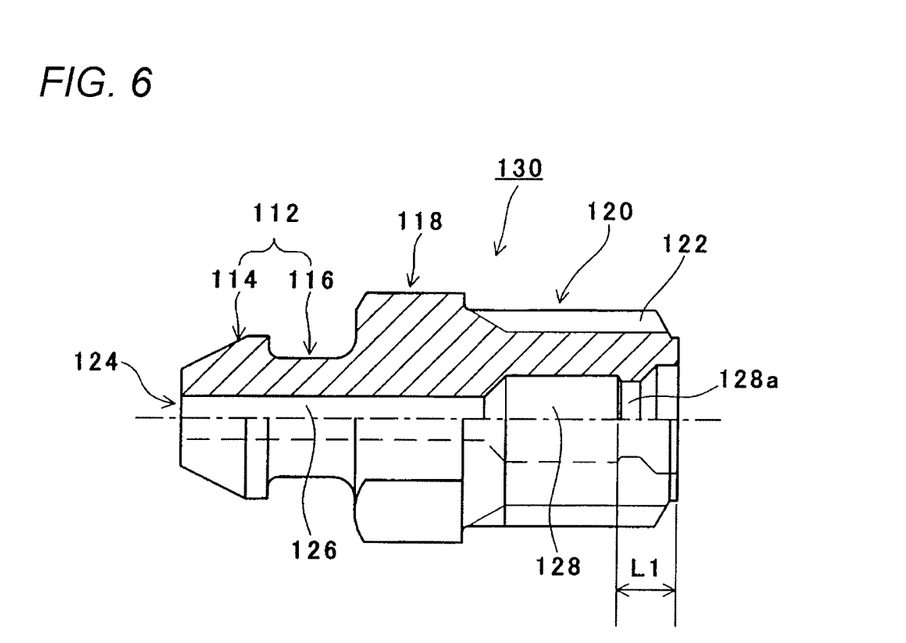
FIG. 6 is a partially sectional front view showing a configuration of a bleeder body of the bleeder plug according to the second illustrative embodiment.

As shown in FIG. 5, a characteristic configuration of the bleeder plug 110 of the second illustrative embodiment is a relation between a through hole 124 and a press fitting portion 144. Specifically, as shown in FIG. 6, in a bleeder body 130 of the bleeder plug 110 of this illustrative embodiment, a larger diameter portion 128 of the through hole 124 is provided with a constricted portion 128a having a smaller diameter. Protruding portion 144 (FIG. 5) formed at a press fitting portion 144 of a seat pin 140 (which will be specifically described later), which are protruding portions protruding from an inner periphery of the large diameter portion 128 in a ring shape, are locked to the constricted portion 128a, so that the seat pin 140 is prevented from coming out.

The constricted portion 128a cab be formed at a predetermined position by performing the extrusion processing from an opening side of the large diameter portion 128 so as to thin the inner periphery side of the large diameter portion 128. Therefore, even for the bleeder body 130 having the above shape, it is possible to manufacture the bleeder plug without the cutting processing, to reduce the processing cost and to improve the productivity.

Figure 7A:
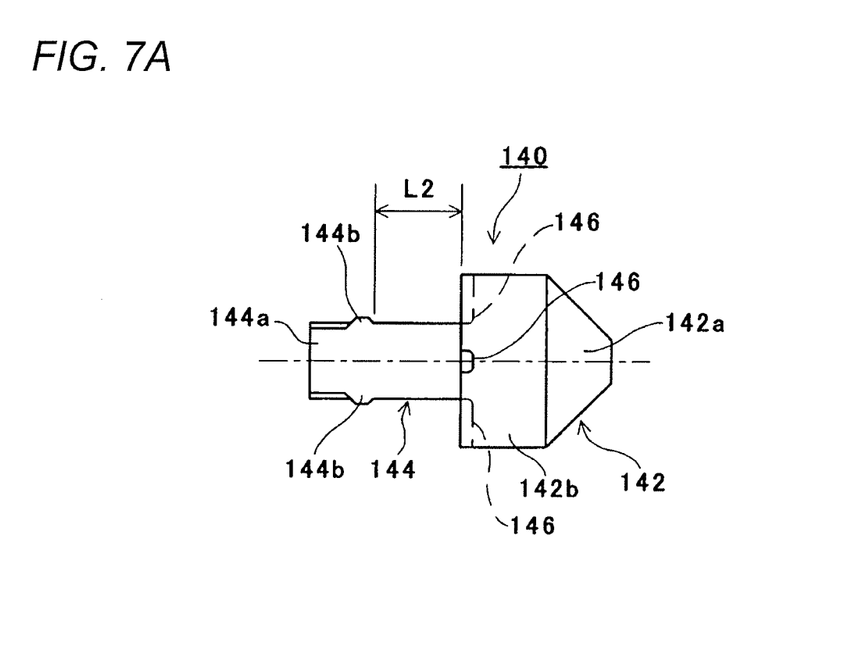
FIG. 7A is a front view of the seat pin and FIG. 7B is a left side view of FIG. 7A.
Figure 7B:
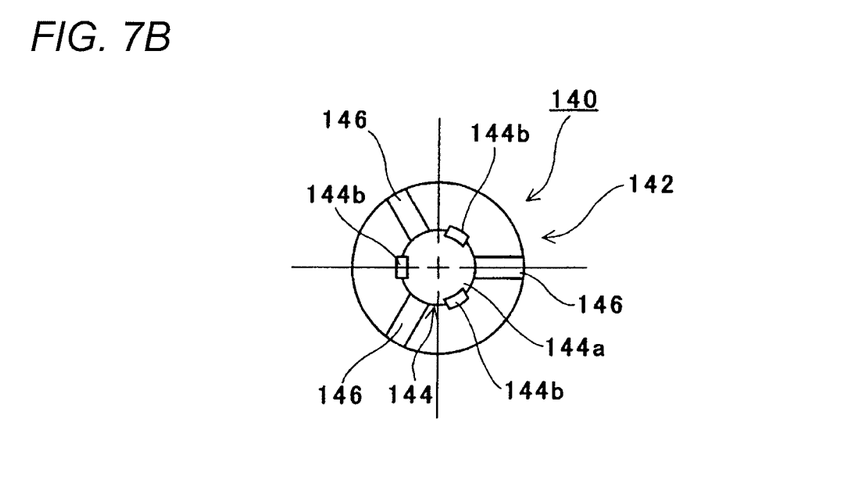

As shown in FIGS. 7A and 7B, the press fitting portion 144 of the seat pin 140 has a cylindrical loose fitting portion 144a and protruding portions 144b formed on an outer periphery of the loose fitting portion 144a. The loose fitting portion 144a is formed to have a radius (diameter) smaller than the constricted portion 128a of the large diameter portion 128 of the through hole 124. Hence, the loose fitting portion 144a can be inserted into the constricted portion 128a and generates a gap between the loose fitting portion and the large diameter portion 128. At least two protruding portions 144b (three, in this illustrative embodiment) are provided on the outer periphery of the loose fitting portion 144a and are formed to have a distance (radius) from a center of the loose fitting portion 144a, which is smaller than the radius of the large diameter portion 128 and larger than a radius of the constricted portion 128a. Here, the protruding portions 144b may be formed by the die forging or may be formed by the extrusion processing from the leading end side of the loose fitting portion 144a, like the constricted portion 128a.

As shown in FIG. 7A, a distance L2 of the loose fitting portion 144a from a base end (bonding portion with a seat portion 142) to the protruding portion 144b is formed to be longer than a distance L1 of the through hole 124 of the bleeder body 130 from a threaded portion 120-side opening (large diameter portion 128-side opening) to the constricted portion 128a (small diameter portion 126-side end of the constricted portion 128a) (refer to FIG. 6). By this configuration, it is possible to prevent the seat pin 140 from coming out by press-fitting the protruding portions 144b into the constricted portion 128a. Also, it is possible to provide a so-called swing (oscillating) function of slightly oscillating the seat portion 142 as the protruding portions 144b comes out from the constricted portion 128a and are thus positioned at the small diameter portion 126-side.

In the bleeder plug 110 having the above features according to the second illustrative embodiment, when threading the bleeder plug 110 into the bleeder hole 60 (refer to FIG. 4), the seat portion 142 is aligned to a center of the bleeder hole 60, so that an automatic alignment by the swing function becomes possible. Hence, even when a center of the threaded portion 120 and a center of the seat portion 142 are deviated, the leakage of the operating oil due to the partial contact of the seat surface is not caused. Accordingly, it is possible to make a permissible error (tolerance) between a central axis of the threaded portion 120 and a central axis of the seat portion 142 larger, compared to the prior art. Thus, it is possible to manufacture the bleeder plug having a high quality just by the cold forging without the cutting processing.

Figure 8A:
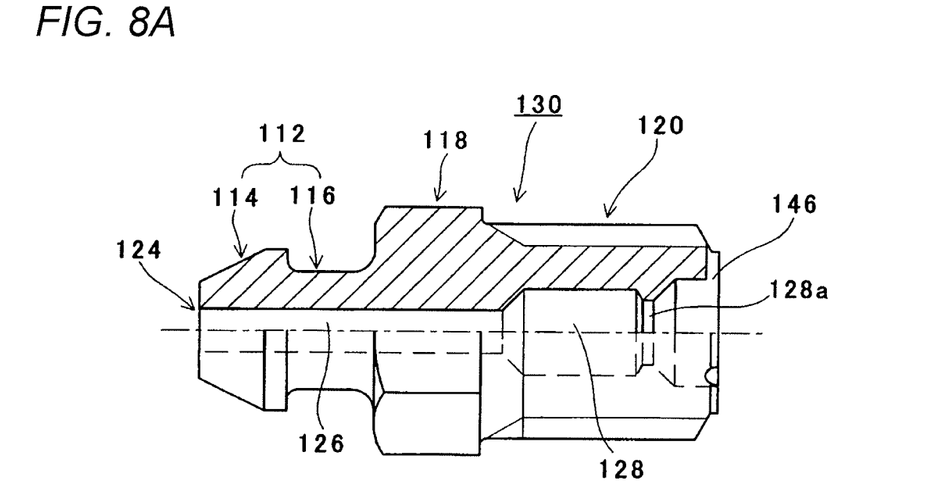
FIG. 8A is a partially sectional front view showing a configuration where the bleeder body is formed with a first groove.
Figure 8B:
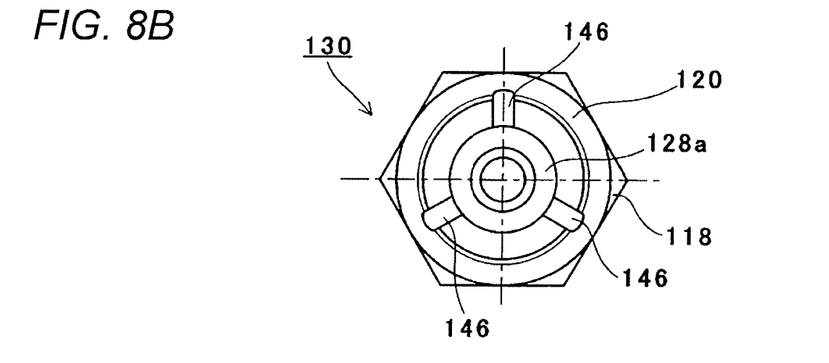
FIG. 8B is a right side view of FIG. 8A
Figure 8C:
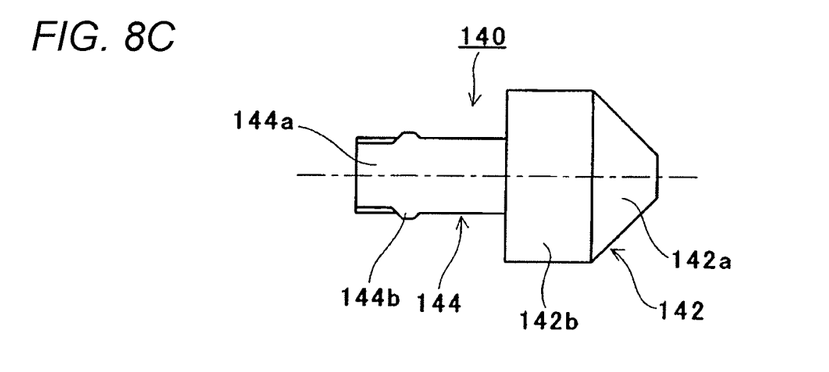
FIG. 8C is a front view of a seat pint that is press-fitted in the bleeder body having the configuration of FIG. 8A.

Also in the bleeder plug 110 of the second illustrative embodiment, as shown in FIG. 7, a first groove 147 that is a path enabling the operating oil or air to pass therethrough is provided to a surface of the seat portion 142 facing the threaded portion 120 or a surface facing the seat portion 42, which surface is an end surface of the threaded portion 120, as shown in an application example of FIG. 8.

Also, in the bleeder plug 110 of the second illustrative embodiment, since a gap is formed between the loose fitting portion 144a of the press fitting portion 144 and the large diameter portion 128, it is not necessary to form a second groove.

The other configurations, operations and effects are the same as those of the in the bleeder plug 10 of the first illustrative embodiment.

In the above illustrative embodiments, the outward appearances of the respective constitutional elements are specifically described so as to easily specify the examples of the invention. However, the outward appearances of the respective constitutional elements can be design-changed within the scope of not deteriorating the functions thereof. For example, in the above illustrative embodiments, the head portion of the nipple portion has a truncated conical shape. However, even when the head portion has an abacus bead shape, for example, it belongs to the scope of the invention.

Although the invention has been specifically described with reference to the specific illustrative embodiments, it is obvious to one skilled in the art that the illustrative embodiments can be variously changed or modified without departing from the spirit and scope of the invention.

This application is based on Japanese Patent Application No. 2010-060823 filed on Mar. 17, 2010, the disclosures of which are incorporated herein by reference.

INDUSTRIAL APPLICABILITY

According to the bleeder plug of the invention, it is possible to manufacture the bleeder plug without the cutting processing in the manufacturing process. Also, even when the bleeder body and the seat pin are fixed due to the adhesion and the like, the problems in bleeding air do not occur.

REFERENCE SIGNS LIST

10: bleeder plug
12: nipple portion
14: head portion

16: constricted portion
18: engaging portion
20: threaded portion
22: male thread
24: through hole
26: small diameter portion
28: large diameter portion
30: bleeder body
40: seat pin
42: seat portion
44: press fitting portion
46: first groove
48: second groove
60: bleeder hole

The invention claimed is:

1. A bleeder plug comprising:
a bleeder body including a nipple portion and a threaded portion, and formed with a through hole extending from the nipple portion-side end to the threaded portion-side end;
a seat pin including a press fitting portion to be press-fitted in an opening of the through hole of the bleeder body at the threaded portion-side and a seat portion blocking a bleeder hole, and
a groove, formed in a contact surface between the bleeder body and the seat pin, and communicating the opening of the through hole at the nipple portion-side with an outside space via the contact surface.

2. The bleeder plug according to claim 1,
wherein at least a part of the through hole has a constricted portion in which a diameter thereof is decreased,
wherein the press fitting portion has a loose fitting portion having a diameter smaller than the constricted portion and a protruding portion provided on an outer periphery of the loose fitting portion and making a radius of the press fitting portion smaller than a radius of the through hole and larger than the constricted portion, and
wherein a length from the seat portion to the protruding portion of the press fitting portion is longer than a length from the opening at the threaded portion-side to the constricted portion.

3. The bleeder plug according to claim 2,
wherein the protruding portion includes a plurality of protrusions arranged on the outer periphery of the loose fitting portion.

4. The bleeder plug according to claim 1,
wherein the through hole has a small diameter portion at the nipple portion-side and a large diameter portion at the threaded portion-side.

5. The bleeder plug according to claim 1,
wherein the groove is provided to the bleeder body.

6. The bleeder plug according to claim 1,
wherein the groove is provided to the seat pin.

7. The bleeder plug according to claim 1,
wherein the contact surface includes:
a first contact surface configured by the threaded portion-side end of the bleeder body and the seat portion; and
a second contact surface configured by the through hole and the press fitting portion, and
wherein the groove is provided to at least one of the threaded portion-side end of the bleeder body and the seat portion configuring the first contact surface and at least one of the through hole and the press fitting portion.

8. The bleeder plug according to claim 7,
wherein a base portion of the press fitting portion is provided with a peripheral groove making a round of an outer periphery thereof.

9. The bleeder plug according to claim 7,
wherein the through hole has a small diameter portion at the nipple portion-side and a large diameter portion at the threaded portion-side, and
wherein the groove is provided to the seat pin.

10. The bleeder plug according to claim 3,
wherein the through hole has a small diameter portion at the nipple portion-side and a large diameter portion at the threaded portion-side, and
wherein the groove is provided to the seat pin.

11. The bleeder plug according to claim 3,
wherein the through hole has a small diameter portion at the nipple portion-side and a large diameter portion at the threaded portion-side, and
wherein the groove is provided to the bleeder body.

* * * * *